United States Patent [19]
Bennington et al.

[11] Patent Number: 4,466,294
[45] Date of Patent: Aug. 21, 1984

[54] TRANSIENT DRIVING CYCLE SIMULATOR TEST SYSTEM

[75] Inventors: James E. Bennington, Ann Arbor; Michael J. Boerma, Pinckney; Anthony J. Brakora; Donald H. Locker, both of Ann Arbor; Terence J. Rhoades, Dexter, all of Mich.

[73] Assignee: EDI, Ann Arbor, Mich.

[21] Appl. No.: 336,069

[22] Filed: Dec. 31, 1981

[51] Int. Cl.³ .............................................. G01L 3/18
[52] U.S. Cl. ..................................... 73/862.13; 73/116
[58] Field of Search ........... 73/862.13, 862.16, 862.18, 73/862.14, 862.15, 862.17, 862.09, 862.11, 862.12, 116, 117, 862.08, 862.34

[56] References Cited
U.S. PATENT DOCUMENTS 3,712,127  1/1973  Petersen ..................... 73/862.14 X
4,327,578  5/1982  D'Angelo .................... 73/862.18 X

FOREIGN PATENT DOCUMENTS 2908677 12/1979 Fed. Rep. of Germany ... 73/862.12

Primary Examiner—Jerry W. Myracle
Attorney, Agent, or Firm—Harness, Dickey & Pierce

[57] ABSTRACT

A transient driving cycle simulator test system for testing a prime mover in a laboratory environment is described, which includes an inertia wheel assembly operatively coupled to the prime mover for simulating vehicle acceleration and deceleration horsepower requirements, a dynamometer operatively coupled to the inertia wheel assembly for simulating vehicle road-load horsepower requirements, and a microcomputer control circuit for providing closed-loop control of the prime mover, the inertia wheel assembly and the dynamometer in response to a set of predetermined transient driving cycle specifications. The inertia wheel assembly features a pair of disc brakes for selectively retarding the rotation of an output shaft of the prime mover to provide forced deceleration of the vehicle being simulated.

9 Claims, 8 Drawing Figures

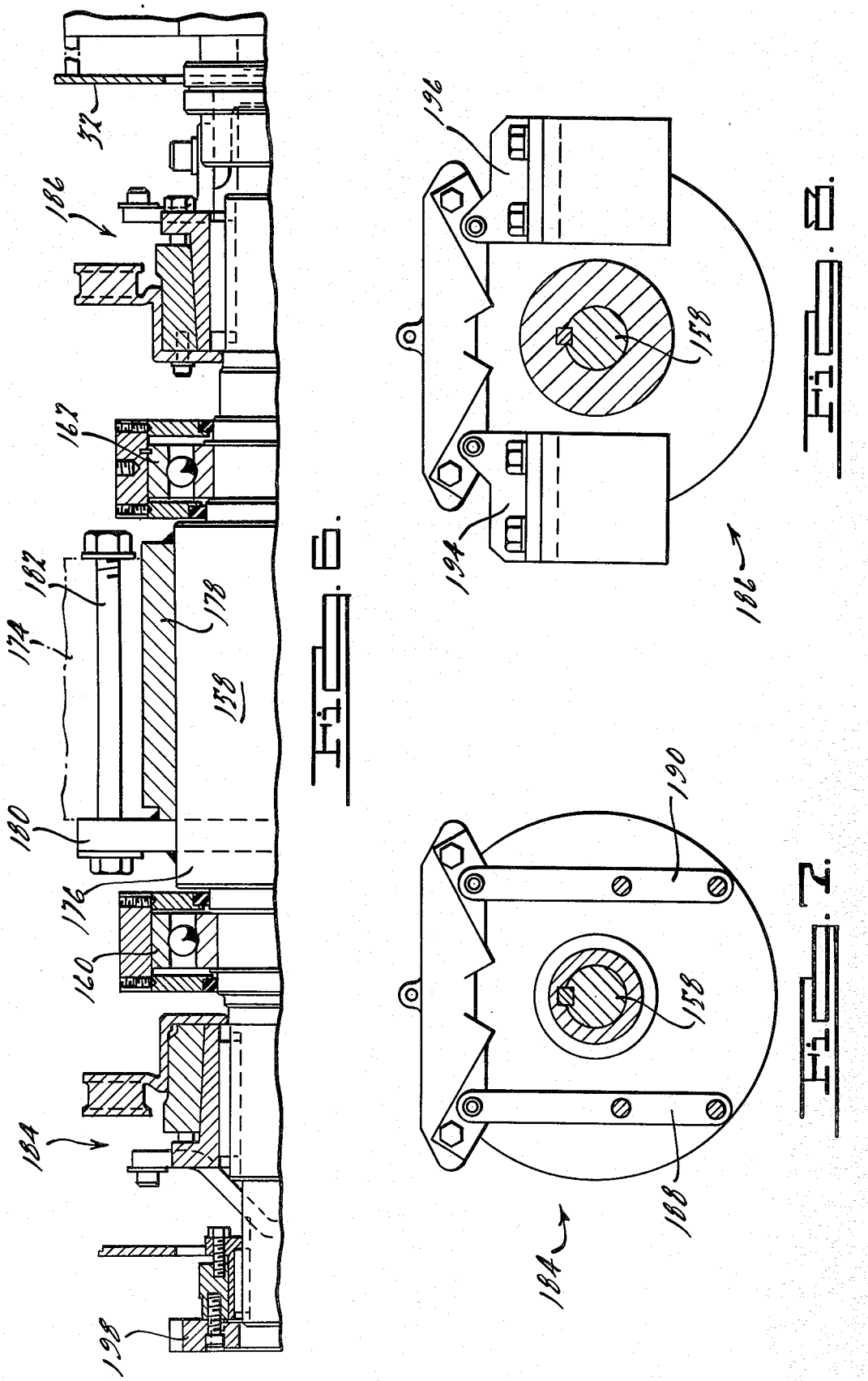

TRANSIENT DRIVING CYCLE SIMULATOR TEST SYSTEM

BACKGROUND AND SUMMARY OF THE INVENTION

The present invention relates generally to prime mover test systems and particularly to test systems which simulate vehicle driving schedules or cycles.

In recent years, the need has arisen to determine or measure the fuel economy, emissions, and durability of internal combustion engines used as prime movers for automobile vehicles. In many cases these tests are required in order to obtain federal government certification of the engines under Environmental Protection Agency (EPA) regulations. These tests are typically based upon standardized vehicle transient driving cycles, such as the EPA "Light Duty Urban Driving Cycle", the "Highway Fuel Economy Cycle" and the "Accelerated Mileage Accumulation Durability Driving Schedule."

Presently, three distinctly different testing methods or systems are used to perform the above identified engine tests. The most cumbersome and least repeatable of these test methods is test-track mileage accumulation. This method requires an entire vehicle to be driven around a course by a driver who attempts to repeatedly perform, with precision, a detailed set of test schedule instructions. Test track conditions are, of course, variable in nature, and vehicle mounting usually limits the sophistication and quantity of instrumentation available to record the necessary data. The second testing method employs a chassis dynamometer to simulate over-the-road vehicle environments. While testing on a chassis dynamometer offers improved reliability and repeatability with respect to the test-track method, an entire vehicle is required to occupy the test site. This not only consumes substantial laboratory space, but also leaves extraneous vehicle related variables and problems (such as tire noise and effects) in the engine testing equation. The third method employs a motor/generator electric dynamometer and a large-scale computer to test engines which have been removed from the vehicle. Although this method removes the extraneous variables contributed by the vehicle and driver and accurately produces road-load horsepower requirements, it is expensive and capital intensive. Furthermore, in order to simulate accelerated mileage accumulation (AMA), this system usually employs averaged data from the test track, which is the least repeatable method of all.

Accordingly, it is a principal object of the present invention to provide a novel prime mover testing system of simple and economical design which can accurately and repeatably simulate transient driving cycles in a laboratory environment.

It is a more specific object of the present invention to provide a transient driving cycle simulator test system which eliminates the need to base test schedules on track or chassis dynamometer speed and load data, and which removes the extraneous variables contributed by vehicles and drivers.

It is a further object of the present invention to provide a transient driving cycle simulator test system which is capable of simulating a plurality of vehicle driving schedules or cycles on the same test site.

It is an additional object of the present invention to provide a novel inertia wheel assembly for use in the transient driving cycle simulator test system which is capable of simulating vehicle acceleration and deceleration horsepower requirements.

In accordance with the foregoing objects, the present invention provides a transient driving cycle simulator test system for a prime mover, which generally comprises an inertia wheel means operatively coupled to the prime mover for simulating vehicle acceleration and deceleration horsepower requirements, a dynamometer means operatively coupled to the inertia wheel means for simulating vehicle road-load horsepower requirements, and microcomputer control circuit means for providing closed-loop control of the prime mover, the inertia wheel means and the dynamometer means in response to a set of predetermined transient driving cycle specifications. The inertia wheel means is calibrated to provide the equivalent inertia force of the vehicle being simulated, and features brake means for selectively retarding the rotation of an output shaft of the prime mover to provide forced deceleration of the vehicle being simulated. The dynamometer means is of the power absorption type capable of simulating the drivetrain, aerodynamic and rolling losses which define the vehicle road-load horsepower requirements.

The microcomputer control circuit means includes a microprocessor for providing a central processing unit, and an erasable programmable read-only memory (EPROM) for storing the set of predetermined transient driving cycle specifications and test sequence instructions. The control circuit means also includes transducer means for sensing at least the rotational speed of the output shaft of the prime mover, and the load applied by the dynamometer means. The control circuit means also includes input interface means for receiving signals from the transducer means and transmitting the signals to the microprocessor, and output interface means for transmitting control signals from the microprocessor to the prime mover, inertia wheel means and the dynamometer means. These control signals generally comprise a throttle signal for controlling the horsepower generated by the prime mover, a brake signal for selectively retarding the rotation of the output shaft of the prime mover and a load signal for controlling the resistance to rotation applied by the dynamometer means.

Additional advantages and features of the present invention will become apparent from a reading of the detailed description of the preferred embodiments which makes reference to the following sets of drawings in which:

BRIEF DESCRIPTION OF THE DRAWINGS

FIG. 6 is a fragmentary view of the inertia wheel assembly shown in FIG. 4, taken generally along the lines 6—6.

FIG. 7 is a side elevation view of a caliper-type disc brake forming part of the inertia wheel assembly with a central shaft of the inertia wheel shown in cross-section, taken generally along the lines 7—7.

FIG. 8 is a side elevation view of another caliper-type disc brake forming part of the inertia wheel assembly with a central shaft of the inertia wheel shown in cross-section, taken generally along the lines 8—8.

DETAILED DESCRIPTION OF THE PREFERRED EMBODIMENTS

Figure 1:
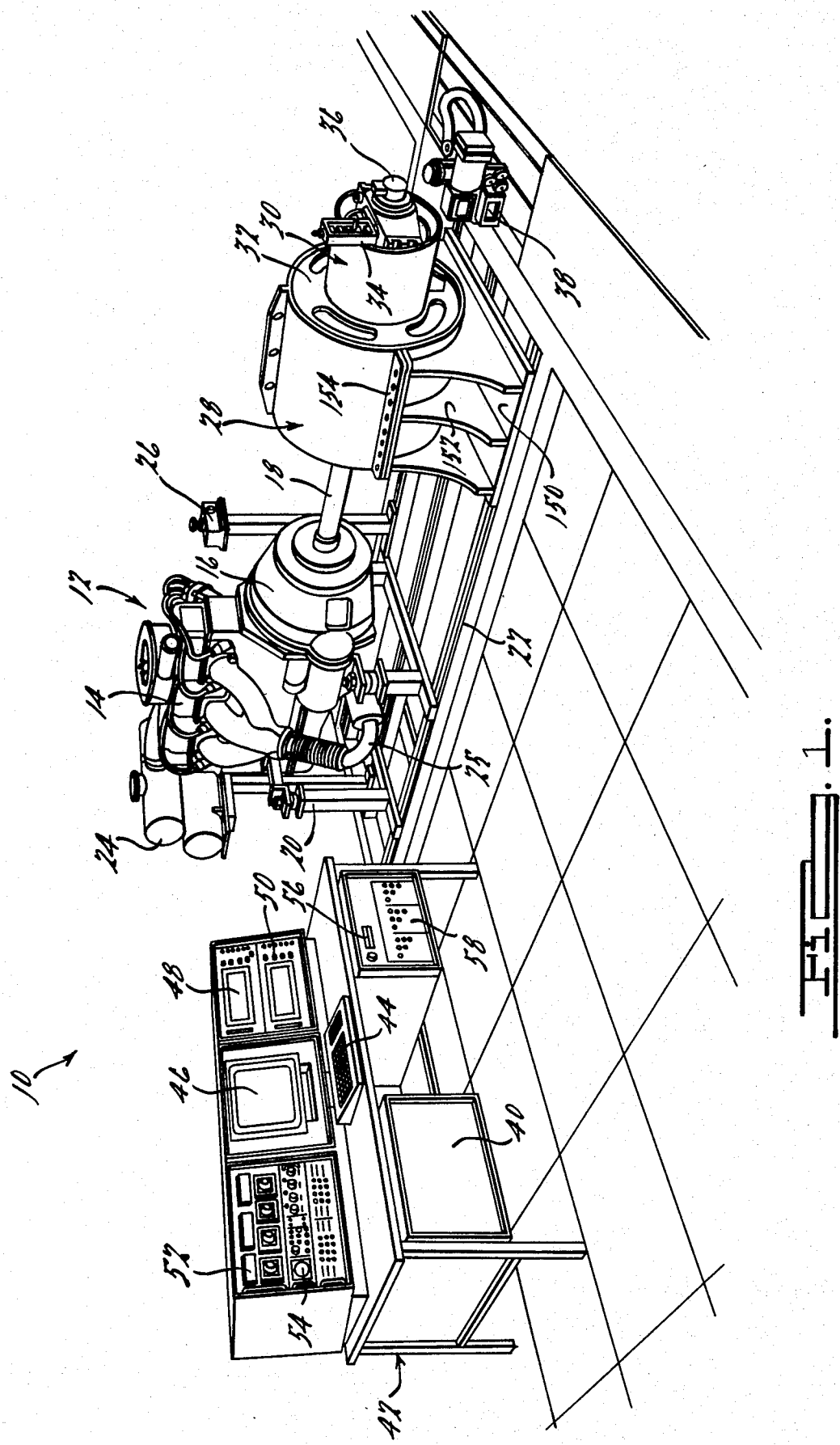
FIG. 1 is a perspective view of a transient driving cycle simulator test system in accordance with the present invention.

Referring to FIG. 1, a transient driving cycle simulator test system 10 according to the present invention is shown to be connected to a prime mover 12 in a laboratory test site. The prime mover 12 comprises a multi cylinder gasoline powered internal combustion engine 14, and an automatic transmission 16 coupled to a crankshaft of the engine and having a rotatable output shaft 18 extending therefrom for transmitting power from the engine. It should be understood that the prime mover 12 illustrated is intended to be exemplary only, and that the test system 10 may be used to measure or determine the performance of a wide variety of prime movers, such as diesel engines, gas and steam turbines, electric motors, and the like. The prime mover 12 is supported by a frame structure 20 which is anchored to a rack structure 22. The engine 14 may also be provided with a cooling system 24 adapted for controlling the temperature of the coolant flowing through the engine, and an exhaust system 25 for controlling the noise generated by the engine and conducting the combustion exhaust gases to a place of safe discharge. A remote emergency stop switch box 26 may also be provided as a safety measure to turn off the engine 14 under the appropriate circumstances.

An inertia wheel assembly 28 is operatively coupled to the output shaft 18 of the prime mover 10 and anchored to the rack structure 22. The inertia wheel assembly 28 is used to simulate the acceleration and deceleration requirements of a vehicle having a predetermined weight and drivetrain. A dynamometer assembly 30 is operatively coupled to the inertia wheel assembly 28 and mounted to an end wall 32 thereof. The dynamometer assembly 30 is used to simulate the drivetrain, aerodynamic and rolling losses which define, at least in part, the road-load requirements of a vehicle having a predetermined drivetrain, weight and frontal area. It will be appreciated that the inertia wheel assembly 28 and the dynamometer assembly 30 operates in combination to simulate a vehicle through all phases of any suitable standardized or custom transient driving cycle or schedule utilized to evaluate the performance of the prime mover 12.

The dynamometer assembly 30 generally comprises a conventional hydraulic dynamometer or water brake which operatively applies a load to the prime mover 12 by resisting the rotation of the output shaft 18. While it is preferred that a hydraulic dynamometer be used, any suitable dynamometer of the power absorption type may be used, such as an eddy-current dynamometer. The dynamometer assembly 30 is equipped with a strain-gauge type electronic load cell 34 for sensing the rotational resistive load applied by the dynamometer. As well known in the art, dynamometers are capable of measuring horsepower indirectly by indicating the amount of force (torque) that the prime mover 12 is producing at the output shaft 18. The load cell 34 of the dynamometer provides an indication of the torque by measuring the magnitude of the applied load or countervailing force which dissipates the power generated by the prime mover 12. The dynamometer is also equipped with a magnetic proximity detector 36 for sensing the rotational speed of the output shaft 18. Using the indicated torque (measured in foot-pounds) and the rotational speed (rpm), the horsepower absorbed by the dynamometer may be readily calculated. The dynamometer assembly 30 also includes a control valve mechanism 38 for regulating the amount of water in the hydraulic dynamometer. Since the power absorption capacity or load applied by the dynamometer is dependent upon the amount of water in the dynamometer, the control valve mechanism 38 may be used to vary the load to account for variations in vehicle and/or drivetrain types, aerodynamic losses, simulated vehicle speeds, and so forth.

In addition to the inertia wheel assembly 28 and the dynamometer assembly 30, the test system 10 includes a microcomputer control circuit 40 which is housed in a control console 42. The microcomputer control circuit 40 monitors the performance and operation of the engine 14, and provides closed-loop control of the prime mover 12, the inertia wheel assembly 28 and the dynamometer assembly 30 in response to a set of the transient driving cycle specifications for the particular driving cycle or schedule selected. The control console 42 includes a keyboard 44 and a cathode ray tube (CRT) display 46 for providing operator interaction with the microcomputer control circuit 40. A pair of strip chart recorders 48 and 50 are provided and may be used to generate a permanent record of one or more operating parameter variations with respect to time. The control console 42 may also include a data display module 52 for digitally displaying the values of operating parameters such as fuel consumption rate, engine oil temperature, engine speed, or the dynamometer load. The data display module 52 also provides for one or more limit switches for regulating the range within which an operating parameter may vary, such as the engine water temperature, and suitable warning lights or alarms for indicating when a preselected limit has been exceeded. The control console 42 may also include a control module 54 for permitting manual control of the engine 14 and the dynamometer assembly 30. The control module 54 provides all of the adjustable controls and switches required for open-loop control of the engine 14 and the dynamometer assembly 30, such as engine ignition and fuel supply switches, engine throttle controls and dynamometer load controls. The control module 54 also includes failure warning indicators, such as for low oil pressure, and an emergency shutdown control. Additionally, the control console 42 may also include a fuel totalizer 56 for indicating the total fuel consumed by the engine 14, and an emissions sample selector 58 for permitting the operator to select the location from which the gaseous emissions from the engine 14 are sampled.

Figure 2:
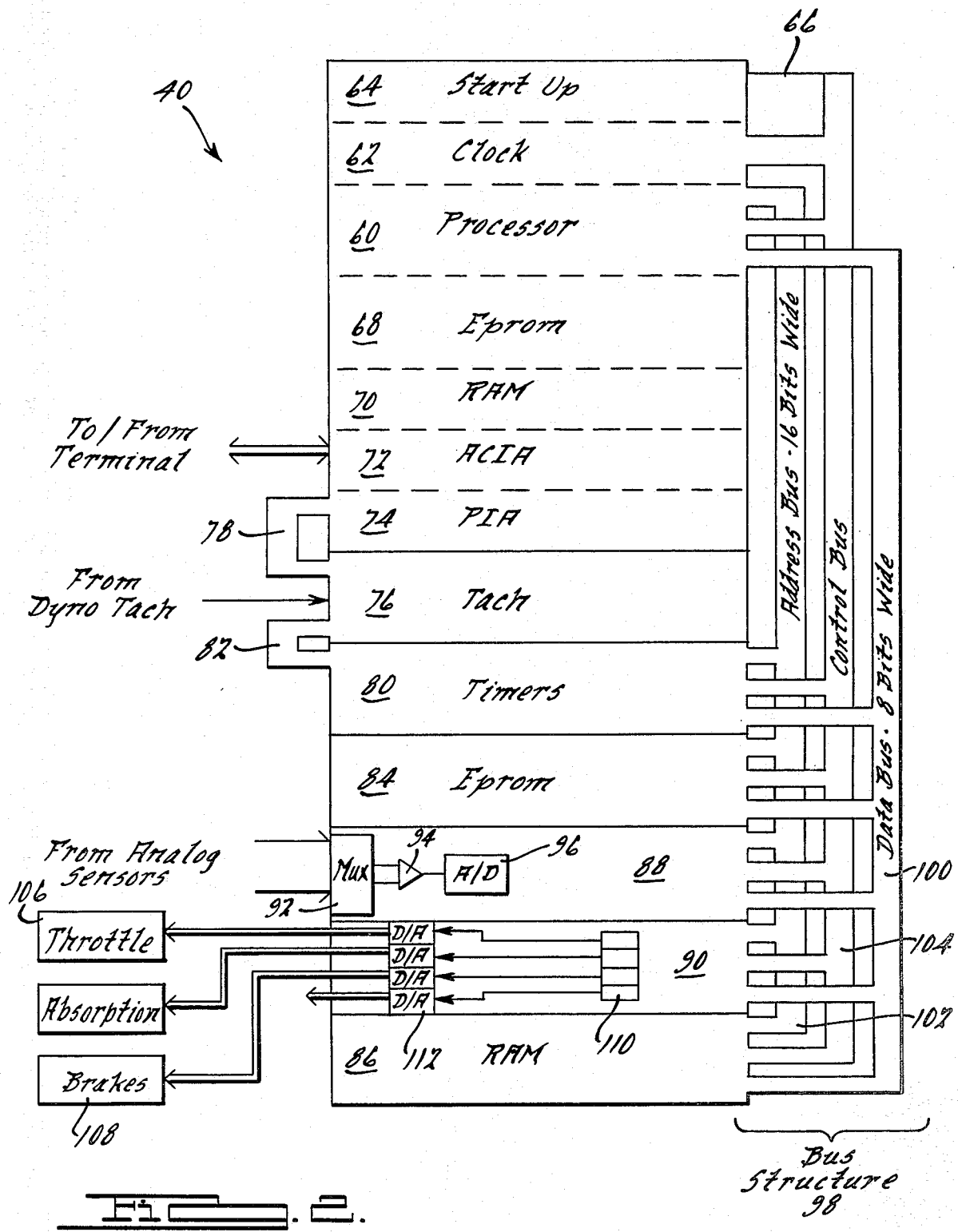
FIG. 2 is a block diagram of a microcomputer control circuit forming part of the transient driving cycle simulator test system of FIG. 1.

Referring to FIG. 2, a block diagram of the microcomputer control circuit 40 is shown. The control circuit 40 includes a microprocessor 60 for providing a central processing unit (CPU). The microprocessor is preferably a Motorola MC6800 series microprocessor, but may comprise any other suitable microprocessor chip such as the Intel 8080A or Zilog Z-80 microprocessors, and the like. The microprocessor 60 is clocked by a two phase 1MHz clock generator circuit 62. A startup circuit 64 is provided for generating a RESET signal on line 66 after power is initially applied to the control circuit 40. This RESET signal causes the microprocessor 60 to execute an initialization routine. A non-volatile memory 68, such as an erasable programmable read only memory (EPROM), is provided for storing an executive program which is used to manage the internal system controls and functions, as will be more fully described below. A random access memory (RAM) 70 is provided for scratchpad storage during calculations.

A serial input/output interface circuit 72 is used to provide asynchronous communication between the microprocessor 60 and the keyboard 44 and CRT display 46 (shown in FIG. 1) on an RS-232-C bus. For example, the interface circuit 72 may be used to transmit data, such as the rotational speed of the output shaft 18, to the CRT display 46 for display thereon. One or more peripheral interface adapter (PIA) circuits 74 provide a general purpose parallel input/output interface. Each PIA circuit 74 includes twenty programmable input/output and control lines, which may be used for example to transmit or receive digital signals in the appropriate application. At this point, it should be noted that all of the circuits described thus far as being included in the control circuit 40 may be found on one circuit board, namely a Motorola M68MM01A micromodule. Accordingly, the interrupted lines between the circuit blocks in FIG. 2, such as between the ACIA circuit 72 and the PIA circuit 74, are used to indicate that these circuits are part of the same circuit card or board; whereas, the solid lines between the circuit blocks are used to indicate that the circuits are found on independent circuit boards.

Figure 3:
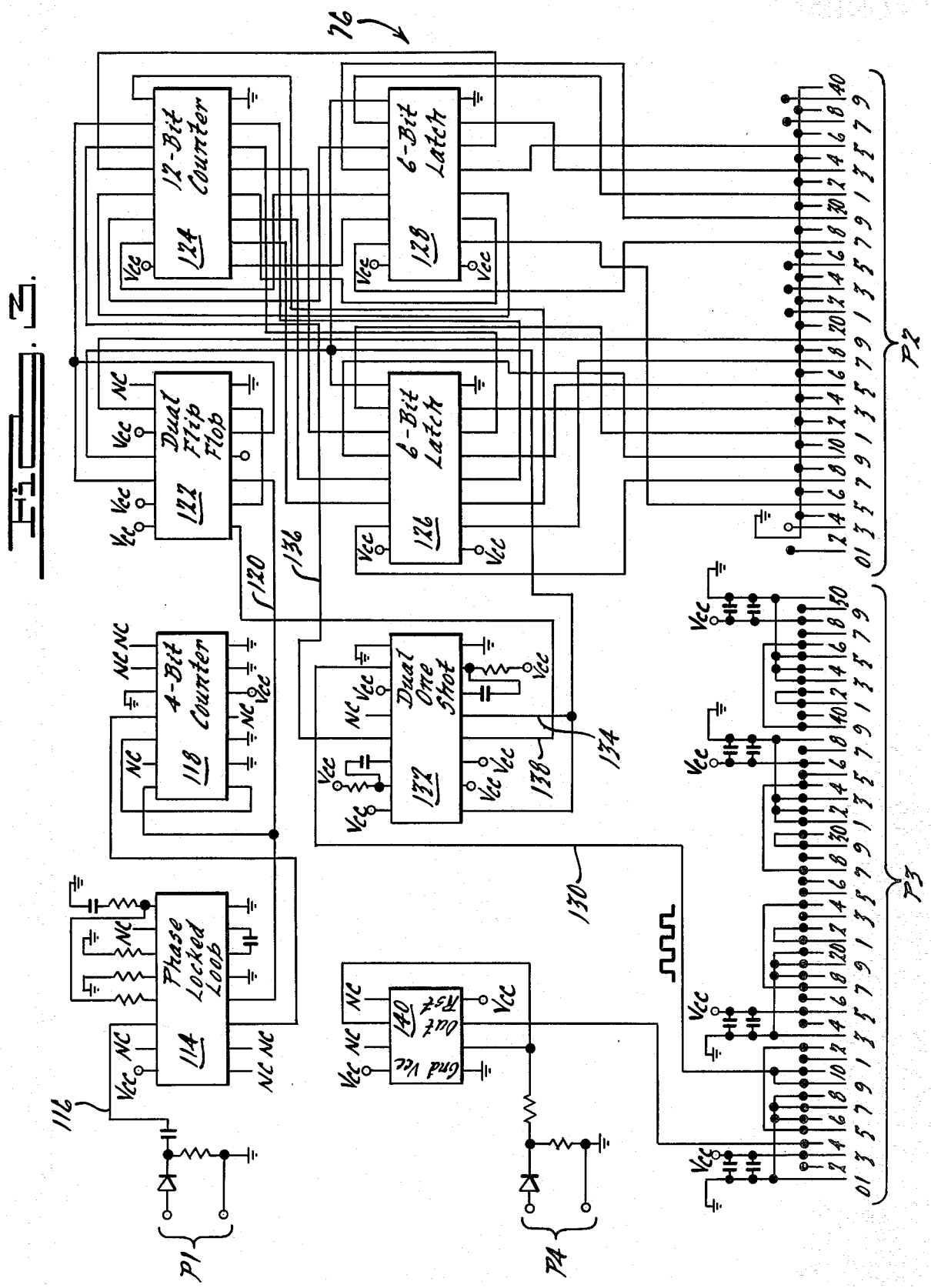
FIG. 3 is a schematic diagram of the tachometer circuit of FIG. 2.

A tachometer circuit 76 is provided for converting the frequency signal received from the magnetic proximity detector 36 into a thirteen bit digital count representative of the rotational speed of the output shaft 18, as will be more fully described with respect to FIG. 3. The output from the tachometer circuit 76 is connected to the PIA circuit 74 through a bus 78. The tachometer circuit 76 is also connected to a timer circuit 80 through a bus 82. The timer circuit 80 is used to provide a ten hertz square wave clock signal to the tachometer circuit 76, as well as to generate any other clock or timing signals required by the control circuit 40. For example, the timer circuit may be used to provide a signal which generates an interrupt request signal every one hundred milliseconds, and a clock signal for determining the number of miles traveled by the simulated vehicle from the frequency signal of the magnetic proximity detector 36. In one form of the present invention, the timer circuit 80 is preferably a 9640 timer module, manufactured by Creative Micro Systems, Garden Grove, Calif.

Another erasable programmable read only memory 84 is provided for storing the set of transient driving cycle specifications and test sequence instructions. In one form of the present invention the memory 84 is preferably a 9616 memory module manufactured by Creative Micro Systems. However, it should be understood that other suitable memory means may be provided for in the appropriate application. The control circuit 40 may also include another random access memory 86 for providing additional scratchpad or miscellaneous data storage. In one form of the present invention, the random access memory 86 is preferably a 9629 memory module manufactured by Creative Micro Systems.

The control circuit 40 further includes an analog data acquisition circuit 88 which serves as an input interface for receiving data, and an analog output circuit 90 which serves as an output interface for transmitting control signals. The data acquisition circuit 88 is adapted to receive one or more analog signals, such as the signal from the dynamometer load cell 34, and process those signals through a multiplexer 92, an amplifier 94 and an analog to digital converter 96. Although not necessary to the operation of the present invention, additional transducers may be employed to generate further analog signals for processing through the data acquisition circuit 88. Accordingly, a mass flow or volume flow meter may be employed for sensing the rate at which the engine 14 is consuming fuel. A laminar flow element or air cart may be used to sense the rate at which air is entering and/or being exhausted from the engine 14. One or more suitable temperature transducers, such as thermocouples, resistance temperature detectors (RTD) or theromistors, may be used for sensing the temperature at user selected locations in the engine 14 and the dynamometer 30. Additionally, an electronic pressure transducer may be used to sense the oil pressure in the engine 14.

In one form of the present invention, the data acquisition circuit 88 is a Motorola M68MM05A analog input circuit card, which is adapted to be interfaced directly to a bus structure 98 of the control circuit 40. The bus structure 98 comprises an eight bit data bus 100, a sixteen bit address bus 102 and a control bus 104. Accordingly, it will be appreciated that the analog signals received by the data acquisition circuit 88 are converted to an appropriate digital signal and thereafter routed to the data bus 100 for transmission to the microprocessor 60. In one form of the present invention, the bus structure 98 is a Motorola M68MMLC unit, which includes a housing, motherboard and power supply.

The analog output circuit 90 is used to transmit control signals from the microprocessor 60 to the prime mover 10, the inertia wheel assembly 28 and the dynamometer assembly 30. These control signals include a throttle or power signal, a load control signal and a brake signal. The throttle signal is directed to an engine throttle actuator 100 for controlling the horsepower generated by the engine 14. The load control signal is directed to the control valve mechanism 38 for controlling the resistive load applied by the dynamometer. The brake signal is directed to a brake actuator 108 of the inertia wheel assembly brake means for selectively retarding the rotation of the output shaft 18 of the prime mover 12 during deceleration. The analog output circuit 90 includes a plurality of latches 110 for receiving the digital control signals from the data bus 100, and a plurality of digital to analog converters 112 for converting these digital control signals into the appropriate analog signal levels. In one form of the present invention, the analog output circuit 90 is a Motorola M68MM05C circuit board. It should be noted that this particular circuit board provides for four output channels or lines, and that the fourth channel may be used to transmit an analog signal for either additional control or monitoring purposes.

Referring now to FIG. 3, a schematic diagram of the tachometer circuit 76 is shown. The tachometer circuit 76 receives the frequency signal from the magnetic proximity detector 36 at port "P1". This signal is then transmitted to a 4046 phase-locked loop circuit 114 along line 116, which operates in combination with a 74C90 four-bit decade counter 118 to multiply the frequency of the incoming tachometer signal on line 116 by ten. The multiplied frequency signal on line 120 is then counted for one tenth of a second by a thirteen bit counter, which comprises one flip flop of a 74C74 dual D-type flip flop circuit 112 and a 4040 twelve bit counter 124. The count thus accumulated is then transmitted to a thirteen bit latch, which comprises a pair of 74C174 hex D-type flip flop circuits 126 and 128 and the other available flip flop of the flip flop circuit 122. The output lines of the thirteen bit latch are connected to a port "P2", which is in turn used to connect the tachometer circuit 76 to the P1A circuit 74.

The timing required to control the counting and latching is derived from a ten hertz square wave clock signal on line 130, which is generated by the timer circuit 80 and transmitted to the tachometer circuit 76 at port "P3". The clock signal on line 130 is transmitted to a 74C221 dual edge-triggered monostable multivibrator (one shot) circuit 132. The one shot circuit 132 is adapted to produce a very short "2Q" pulse (approximately one microsecond in duration) on line 134 at the rising edge of the clock signal. The "2Q" pulse causes the current contents of the twelve bit counter 124 to be latched into the flip flop circuits 126 and 128, as well as the one bit count in the flip flop circuit 122 to be transferred into the other flip flop in that circuit. When the "2Q" pulse falls, the one shot circuit 132 is triggered again, and a very short "1Q" pulse is produced on line 136 and a correspondingly short "$\overline{1Q}$" pulse is produced on line 138. The "1Q" pulse and "$\overline{1Q}$" pulse cause the flip flop circuit 122 and the twelve bit counter circuit 124 to be reset or cleared to a zero count and the thirteen bit counter is released to count again for another tenth second period. Accordingly it should be appreciated that the tachometer circuit 76 produces a thirteen bit count of the frequency signal from magnetic proximity detector by first multiplying the frequency by ten and then counting this multiplied signal for only one tenth of a second.

The tachometer circuit 76 also includes a 555 timer 140 which receives a sixty hertz clock signal from port "P4" and operates as a buffer. The sixty hertz clock signal is derived from the transformer of the M68MMLC bus structure 98. The timer 140 is adapted to shape the sixty hertz clock signal into a square wave and transmit it to the real time clock hardware on the timer circuit 80 via port "P3". It should be noted that the tachometer circuit board may also contain a prototype area for building miscellaneous circuits which might be useful in particular applications. For example, this prototype area may be used to contain switching circuits for turning on and off the engine ignition and fuel supply under the control of the microprocessor 60. Additionally, a second magnetic proximity detector could be installed at another user selected location for redundancy or other considerations, and circuits could be employed to digitally compare the frequency signal from this detector with the frequency signal from the detector 36. Thus, the counts over a predetermined period could be compared to determine for example if there was a shaft breakage or a detector failure. Finally, it may also be noted that the frequency signal from the detector 36 may also be transmitted to the timer circuit 80 for use in determining the number of miles traveled by the vehicle being simulated. For example, the pulses from the frequency signal may be counted by the counters in the timer circuit 80 and then converted to vehicle miles traveled by knowing the ratio of the driveshaft revolutions to vehicle miles.

Figure 4:
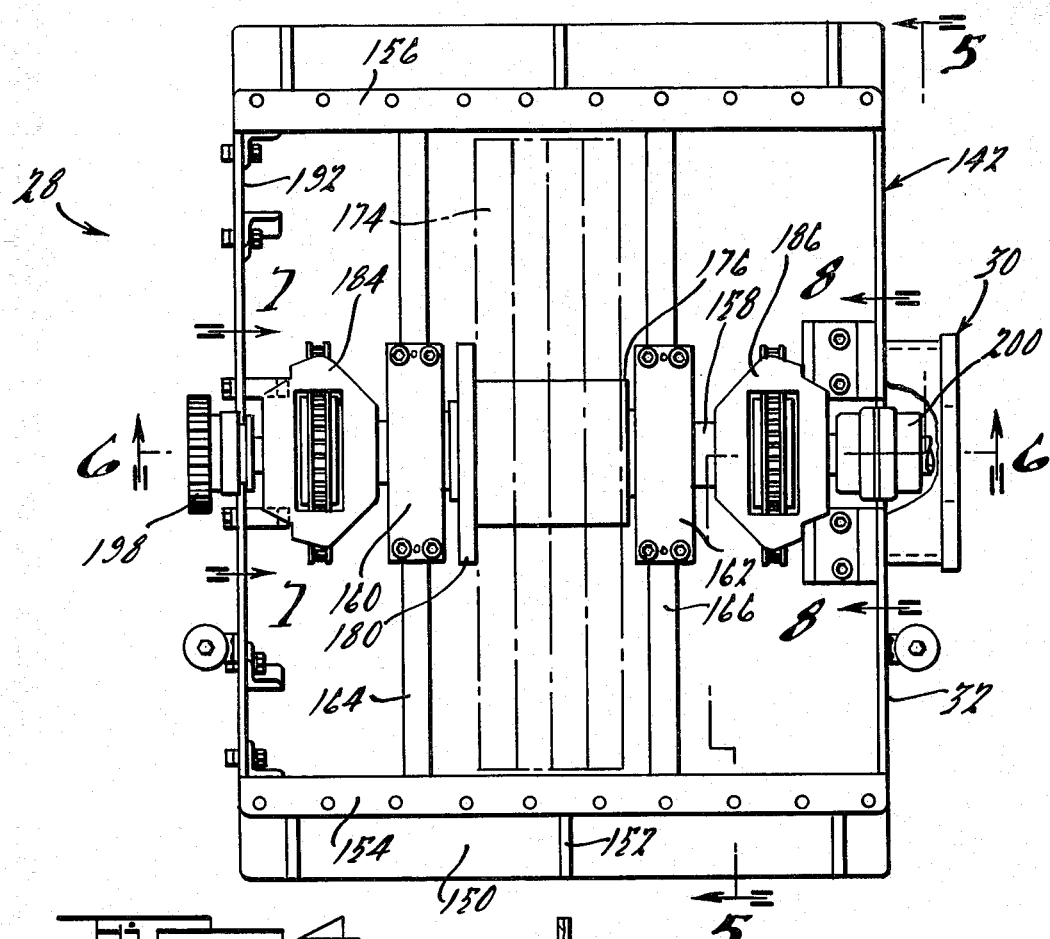
FIG. 4 is a top elevation view of an inertia wheel assembly with the top half section of the housing removed, which forms part of the transient driving cycle simulator test system of FIG. 1.
Figure 5:
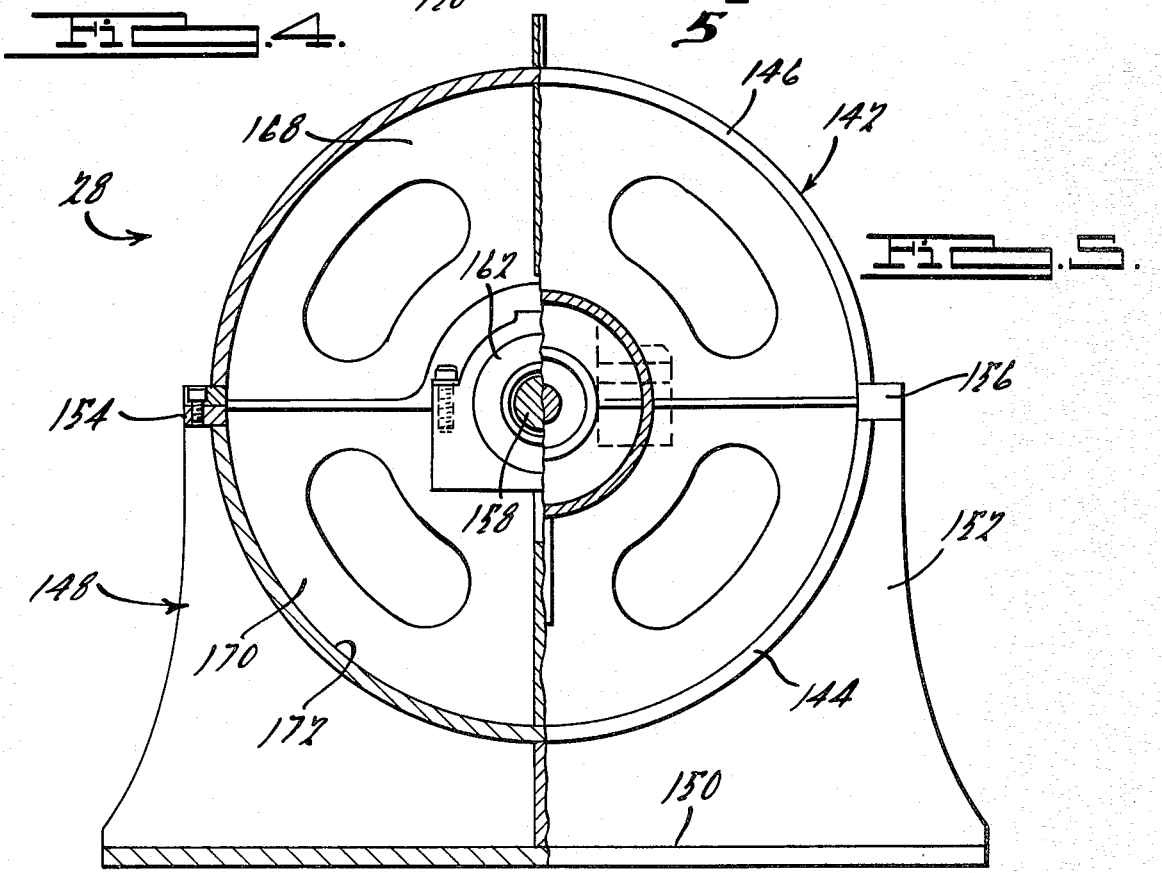
FIG. 5 is a cross-sectional view of the inertia wheel assembly shown in FIG. 4, taken generally along the lines 5—5.

Referring now to FIGS. 4 through 8, the inertia wheel assembly 28 according to the present invention is shown in detail. FIG. 4 is a top elevation view of the inertia wheel assembly 28, shown with the top half section of a housing 142 removed. As may best be seen with reference to FIG. 5, the housing 142 is generally cylindrical in shape, and comprises a bottom half section 144, a top half section 146, and a base structure 148. The base structure 148 includes a horizontally disposed base plate 150 and a plurality of vertically disposed support members 152 which conform to the shape of the bottom half section 144. The top half section 146 is adapted to be bolted to the bottom half section 144 along the sides of the inertia wheel assembly via side flanges 154 and 156.

The inertia wheel assembly 28 also includes a central shaft 158 which is rotatably mounted to the housing 142 by a pair of bearings 160 and 162, each of which is supported by annular bulkheads 164 and 166, respectively. Each of the bulkheads 164 and 166 comprises a pair of generally semicircular-shaped bulkhead sections, such as the top bulkhead section 168 and the bottom bulkhead section 170 of bulkhead 166 shown in FIG. 5. The bulkheads 164 and 166 are disposed transversely to the axis of the central shaft 158, and are shaped to conform to an annular interior surface 172 of housing 142. The bottom sections of the bulkheads 164 and 166 are preferably welded to the interior surface 172, while the top sections are preferably bolted to the bottom sections. The structure of the bearings 160 and 162 as well as the exterior shape of the central shaft 158 may best be seen with reference to FIG. 6.

The central shaft 158 is adapted to support a plurality of flywheels 174 (shown in phantom), which are coaxially mounted on an enlarged portion 176 thereof such that the flywheels will rotate therewith. The number and/or size of the flywheels 174 may be varied for calibrating the inertia wheel assembly 28 to provide the equivalent inertial force of the vehicle being simulated by the test system 10. A suitable tubular sleeve member 178 may also be interposed between the flywheels 174 and the enlarged portion 176 of the central shaft 158. A radially extending annular barrier member 180 is welded to the enlarged portion 176 of the central shaft 158, and is adapted to secure the flywheels 174 thereto via a plurality of circumferentially spaced bolts 182.

The inertia wheel assembly 28 further includes a pair of brakes 184 and 186 mounted to the housing 142 and disposed substantially coaxially around the central shaft 158 such that the flywheels 174 are interposed therebetween for providing a balanced load on the central shaft. As earlier noted, the brakes 184 and 186 are provided for selectively retarding the rotation of the output shaft 18 of the prime mover 12 via the central shaft 158 of the inertia wheel assembly 28 under the control of the microcomputer control circuit 40. The brakes are preferably caliper-type disc brakes, such as the Delco Moraine G.M. part No. 3996663 brakes, but may be of any other suitable brake design capable of braking the vehicle being simulated. The brakes 184 and 186 may best be seen with reference to FIGS. 7 and 8, respectively. Each brake is provided with suitable bracket structures for mounting the brakes to the side walls of the housing 142. For example, brackets 188 and 190 are used to mount the brake 184 to an end wall 192 of the housing 142, and brackets 184 and 196 are used to mount the brake 186 to the end wall 32 of the housing.

The inertia wheel assembly 28 additionally includes a conventional SAE coupler 198 mounted to one end of the central shaft 158 for connecting the central shaft to the output shaft 18 of the prime mover 12. Another conventional coupler 200 is also mounted to the other end of the central shaft 158 for connecting the central shaft to a rotor shaft (not shown) of the dynamometer assembly 30. It will be appreciated that the inertia wheel assembly 28 should be anchored to the rack structure 22 such that the central shaft 158 is coaxially aligned with the output shaft 18 of the prime mover 12, and the dynamometer should be mounted to the inertia wheel assembly such that the rotor shaft is coaxially aligned with the central shaft.

With respect to the test sequence software for the transient driving cycle simulator test system 10, two basic simulation blocks are required, namely a driver simulator block and a vehicle road-load horsepower simulator block. Driver simulation is provided by microcomputer control of the engine throttle actuator 106 and the inertia wheel assembly brakes 184 and 186. As long as the driving cycle or schedule is describable in terms of a vehicle speed (velocity) and time (seconds) or distance (miles traveled), the microcomputer control circuit 40, operating through feedback control loops for the throttle and brake position command signals, will "drive" the engine through the test schedule. To provide smooth and precise control, it is preferred that the vehicle speed schedule be separated or broken into intervals of 100 millisecond duration.

The vehicle road-load horsepower simulator block is adapted to provide feedback, closed-loop microcomputer control of the dynamometer assembly 30 according to a specific equation for each vehicle/drivetrain to be simulated. This equation defines the road-load horsepower as the brake horsepower required to move a vehicle at a constant velocity along a straight line over a level road without any wind effects, and is set forth below as follows:

$$BHP = (C_1 \cdot V) + (C_2 \cdot W \cdot V) + (C_3 \cdot A \cdot V^3),$$

where
$C_1$, $C_2$ and $C_3$ are constants
W = Vehicle Weight
A = Vehicle Frontal Area
V = Vehicle Velocity The term "$C_1 \cdot V$" represents the drivetrain losses, the term "$C_2 \cdot W \cdot V$" represents the rolling friction losses, and the term "$C_3 \cdot A \cdot V^3$" represents the aerodynamic losses. The values for the coefficients $C_1$, $C_2$ & $C_3$ are usually determined experimentally and will differ between vehicles. The experimental techniques to determine the coefficients generally consist of a series of measurements of the time required for a vehicle to coast down between two speeds and relating the resulting change in kinetic energy to horsepower. It should be noted that the above-identified equation directly relates the speed of the vehicle to the horsepower required to sustain that speed. The speed of the vehicle may also be related to the rotational speed of the output shaft 18 from an experimentally determined ratio referred to as "N/V", where N is the rotational speed of the output shaft. It should also be noted that the well known mathematical terms for road grade or wind variations may be readily incorporated into the road-load horsepower equation in the appropriate application.

The inertia wheel assembly 28 simulates vehicle acceleration and deceleration horsepower requirements by the appropriate selection for the size and number of the flywheels 174 such that at any given rotational speed for the output shaft 18, the kinetic energy of the system rotating components equals the kinetic of the vehicle at that output shaft speed. The required inertia may be calculated from the following energy balance equation, providing that the vehicle weight "W" (lbf) and the "N/V" ratio are known:

$$\tfrac{1}{2}mV^2 = \tfrac{1}{2}Jw^2,$$

where
J = inertia in slug-ft$^2$
w = driveshaft speed in rad/sec
V = velocity in ft/sec
m = vehicle mass (slugs) = W (lbf)/32.17 ft/sec$^2$ From the energy balance equation:

$$J = mV^2/w^2$$

Since $$V = [N/(N/V)] \cdot [5280(\text{ft/mi})/3600(\text{sec/hr})]\text{ft/sec}$$

and $$w = [2\pi(\text{rad/rev}) \cdot N(\text{rev/min})/60(\text{sec/min})]\text{rad/sec},$$

then $$J = \left[\frac{W}{32.17}\right] \cdot \left[\frac{1}{(N/V)} \cdot \frac{5280}{3600} \bigg/ \frac{2\pi}{60}\right]^2$$

$$J = 6.09754 \left[\frac{W}{(N/V)^2}\right] \text{ slug} - \text{ft}^2$$

$$J = 196.16 \left[\frac{W}{(N/V)^2}\right] \text{ lbm} - \text{ft}^2$$

$$J = 28246.7 \left[\frac{W}{(N/V)^2}\right] \text{ lbm} - \text{in}^2$$

It should be noted that the inertia "J" is equal to the sum of the shaft, the flywheels, the dynamometer, hubs and brake rotors. Since the inertia of the flywheels 174 is the only variable, a minimum inertia is obtained. However, this minimum inertia typically only comprises approximately five percent (5%) of the normal range of desired inertias. The flywheels 174 are then sized to provide the necessary inertia "J" according to the following equation:

$$J = \pi(d_o^4 - d_i^4)\text{pt}1\,32g$$

where
$d_o$ = the outer diameter of the flywheel (ft)
$d_i$ = the inner diameter of the flywheel (ft)
p = the flywheel material density (lbf/ft$^3$)
t = the flywheel thickness (ft)
g = the acceleration due to gravity (32.17.17 ft/sec$^2$)

A typical test cycle sequence will now be briefly described. With the automatic transmission 16 in "neutral", the operator turns on the engine ignition and fuel supply to start the engine 14. After the engine is running, the operator then shifts the transmission into "drive". At this point the microcomputer control circuit 40 will be transmitting an appropriate brake control signal which will cause the brakes 184 and 186 to prevent the rotation of the output shaft 18, a throttle control signal causing the engine 14 to idle, and a load signal causing no load to be applied by the dynamometer assembly 30.

The operator then executes a RUN command on the keyboard 44 and the microcomputer control circuit will respond by initiating the predetermined test sequence. Within the one hundred millisecond interval between command updates, the microcomputer control circuit will perform the following functions:

(a) read the speed of the output shaft 18 from the magnetic proximity detector 36 and convert it to the vehicle speed;

(b) read the dynamometer torque from the load cell 34;

(c) look up or calculate the desired vehicle test speed;

(d) perform a conventional proportional—integral—differential (PID) algorithm employing the actual speed, the desired speed, the last throttle command value, and calculate a new throttle command;

(e) calculate the road load torque equivalent to the current vehicle speed;

(f) perform a PID algorithm employing the measured plus friction torque, the calculated road-load torque, the last load control command, and calculate a new load control command;

(g) compare the new throttle command to its upper and lower limits, and limit the throttle command value if necessary;

(h) compare the new load control command to its upper and lower limits, and limit the load control command value if necessary;

(i) if the new throttle command has been limited to its lower limit, calculate a brake command value;

(j) transmit the new throttle, load control and brake commands; update "odometer"; and (k) update the test time clock, the real time clock and check the memory for reliability.

With respect to the executive software stored in the memory 68 of the microcomputer control circuit 40, a complete listing of this program in assembly language is attached to the application as an appendix thereto. The executive software performs system context switching and management concurrently on a fixed priority-ordered basis, which allows the microcomputer control circuit 40 to complete higher-priority tasks before lower-priority tasks in the available time limits. The executive software provides several useful functions, including those briefly described below. It manages character input/output between the keyboard 44 and CRT 46 and the control circuit 40. It provides arithmetic and character manipulation resources to the various tasks on a shared basis. It provides an arithmetic routine which implements a PID algorithim for calculating new throttle, load control and brake commands.

The executive software also provides a command parser and interpreter which can influence the computer's operation at both the system level (turning tasks defined in the system command table on and off, and performing subroutines to alter system memory, thereby reconfiguring certain operations of the machine) and at the user level (turning user-defined tasks on and off, and altering user memory in prescribed sequences). It maintains a real-time clock and a test hours clock. It periodically tests the system memory for reliability. It initializes the system resources, including the control circuit memories and the input/output devices. It provides a debug monitor (and two means of activating this task). This monitor gives an operator the means to diagnose and modify the state of the system. Through the monitor, one can examine and change memory contents, force outputs to known states, examine and change the system task table, and re-enter the test sequence program at the same point where it was left. It provides data acquisition and scaling to engineering units, closed-loop system control, test schedule following, data display, and calculation of elapsed time and "distance" in the test. The control updates and data acquisition routines are performed about ten times per second. It also allows multiple user-defined schedules to be resident in memory, although only one schedule may be run at any one time.

It will be appreciated that the above-disclosed embodiment is well calculated to achieve the aforementioned objects of the present invention. In addition, it is evident that those skilled in the art, once given the benefit of the foregoing disclosure, may now make modifications of the specific embodiment described herein without departing from the spirit of the present invention. Such modifications are to be considered within the scope of the present invention which is limited solely by the scope and spirit of the appended claims.

What is claimed is:

1. An inertia wheel assembly for simulating vehicle acceleration and deceleration horsepower requirements for a prime mover in a transient driving cycle simulator test system comprising:

a generally cylindrical housing having a base structure, a bottom half section fixedly secured to said base structure and a top section detachably secured to said bottom half section;

a central shaft rotatably mounted to said housing and extending therethrough;

at least one flywheel coaxially mounted on said central shaft such that said flywheel will rotate therewith;

a pair of disc brakes mounted to said housing in association with said central shaft for selectively retarding the rotation of said central shaft; and coupling means for connecting one end of said central shaft to said prime mover.

2. A transient driving cycle simulator test system for a prime mover, comprising:

inertia wheel means operatively coupled to said prime mover for simulating vehicle acceleration and deceleration horsepower requirements, said inertia wheel means including a cylindrical housing which substantially encloses said inertia wheel means and supports a central shaft rotatably mounted to said housing, at least one flywheel mounted to said central shaft, and a pair of disc brakes mounted to said housing such that said flywheel is interposed between said disc brakes;

dynamometer means operatively coupled to said inertia wheel means for simulating vehicle road-load horsepower requirements; and microcomputer control circuit means for providing closed-loop control of said prime mover, said pair of disc brakes and said dynamometer means in response to a set of predetermined transient driving cycle specifications.

3. The transient driving cycle simulator test system according to claim 2 wherein said dynamometer means is coupled to another end of said central shaft of said inertia wheel means, and is of the power absorption type capable of operatively applying a rotational resistive load to said output shaft of said prime mover for simulating the drivetrain, aerodynamic and rolling losses defining, at least in part, the vehicle road-load horsepower requirements.

4. The transient driving cycle simulator test system according to claim 3 wherein said microcomputer control circuit means includes
 a microprocessor for providing a central processing unit,
 memory means for storing said set of predetermined transient driving cycle specifications and test sequence instructions,
 transducer means for sensing at least one rotational speed of said output shaft of said prime mover and said rotational resistive load applied by said dynamometer means,
 input interface means for receiving signals from said transducer means and transmitting said signals to said microprocessor, and
 output interface means for transmitting control signals from said microprocessor to said prime mover, said pair of disc brakes and said dynamometer means.

5. The transient driving cycle simulator test system according to claim 4 wherein said control signals include a throttle signal for controlling the horsepower generated by said prime mover, a brake signal for controlling said pair of disc brakes of said inertia wheel means and a load signal for controlling the rotational resistive load applied by said dynamometer means.

6. An inertia wheel assembly for simulating vehicle acceleration and deceleration horsepower requirements for a prime mover in a transient driving cycle simulator test system comprising:
 a generally cylindrical housing;
 a central shaft rotatably mounted to said housing and extending therethrough;
 at least one flywheel coaxially mounted on said central shaft such that said flywheel will rotate therewith;
 brake means for simulating braking of said vehicle mounted to said housing in association with said central shaft for selectively retarding the rotation of said central shaft, said brake means including a pair of caliper-type disc brakes disposed substantially coaxially around said central shaft such that said flywheel is interposed between said disc brake, and
 coupling means for connecting one end of said central shaft to said prime mover.

7. The inertia wheel assembly according to claim 6, wherein said coupling means also connects another end of said central shaft to a dynamometer.

8. The inertia wheel according to claim 7 wherein said central shaft is adapted for supporting a plurality of flywheels.

9. The inertia wheel assembly according to claim 8 wherein said central shaft is rotatably mounted to said housing by a pair of bearings, each of said bearings being supported by a generally semi-circular shaped bulkhead member secured to said housing.

* * * * *

UNITED STATES PATENT AND TRADEMARK OFFICE
CERTIFICATE OF CORRECTION

PATENT NO. : 4,466,294

DATED : 8/21/84

INVENTOR(S) : James E. Bennington et al

It is certified that error appears in the above-identified patent and that said Letters Patent is hereby corrected as shown below:

<u>On the Title Page</u>: Under U.S. Patent Documents
Insert --2,270,760 1/42 Mershon--

Column 9, line 1, "184" should be --194--

Column 10, line 58, "$J = \pi (d_o^4 - d_i^4)$ ptl 32g" should be

--$J = \pi (d_o^4 - d_i^4)$ pt/32g--

Column 10, line 65, "$(32.17.17 \text{ ft/sec}^2)$" should be --$(32.17 \text{ ft/sec}^2)$--

Signed and Sealed this

Thirtieth Day of April 1985

[SEAL]

Attest:

DONALD J. QUIGG

*Attesting Officer*  *Acting Commissioner of Patents and Trademarks*